US009940799B2

(12) United States Patent

Kemp et al.

(10) Patent No.: US 9,940,799 B2

(45) Date of Patent: Apr. 10, 2018

(54) FENCE MONITORING

(71) Applicant: Marius Kemp, Welkom (ZA)

(72) Inventors: Marius Kemp, Welkom (ZA); Alexander Prinsloo Ross, Welkom (ZA)

( * ) Notice: Subject to any disclaimer, the term of this patent is extended or adjusted under 35 U.S.C. 154(b) by 24 days.

(21) Appl. No.: 14/884,187

(22) Filed: Oct. 15, 2015

(65) Prior Publication Data

US 2016/0042618 A1 Feb. 11, 2016

Related U.S. Application Data

(63) Continuation of application No. PCT/IB2014/060701, filed on Apr. 14, 2014.

(51) Int. Cl.

*B60Q 1/00* (2006.01)
*G08B 13/12* (2006.01)
*E04H 17/14* (2006.01)

(52) U.S. Cl.

CPC ....... *G08B 13/122* (2013.01); *E04H 17/1426* (2013.01)

(58) Field of Classification Search

CPC ............................ G08B 13/122; G08B 13/124
USPC ................... 340/541, 545.2, 545.4, 561, 564
See application file for complete search history.

(56) References Cited

U.S. PATENT DOCUMENTS 4,518,953 A 5/1985 Hunter et al.
4,703,313 A * 10/1987 Husmann ............. G08B 13/122 340/550
4,800,366 A * 1/1989 Husmann ............. G08B 25/018 340/524
4,829,287 A 5/1989 Kerr et al.
5,852,402 A * 12/1998 Perry ...................... E04H 17/10 256/10
6,456,198 B1 * 9/2002 Kato ...................... G08B 13/26 256/10
6,712,339 B1 * 3/2004 Smith .................... A01K 3/005 256/10

FOREIGN PATENT DOCUMENTS

DE 202005003464 U1 7/2005
GB 1585602 A 3/1981

OTHER PUBLICATIONS

The International Search Report and the Written Opinion of the International Searching Authority of PCT/IB2014/060701, Austrian Patent Office, Vienna, Austria, dated May 26, 2014.

* cited by examiner

*Primary Examiner* — Toan N Pham

(74) *Attorney, Agent, or Firm* — M&B IP Analysts, LLC

(57) ABSTRACT

A fence alarm, having a plurality of laterally spaced electrically conductive fence elements, the fence elements electrically being connected in series with each other, a sensing arrangement electrically connected to the plurality of conductive fence elements, the sensing arrangement being calibrated to a nominal electrical value, the sensing arrangement further being operable to sense a predefined deviation from the nominal electrical value caused by a deviation in an electrical property of the conductive fence elements.

17 Claims, 4 Drawing Sheets

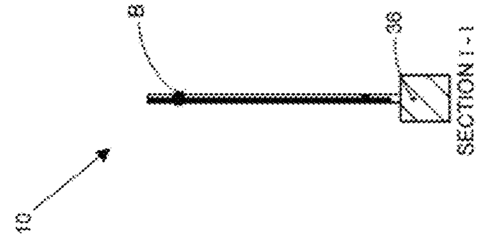
Figure 1.2
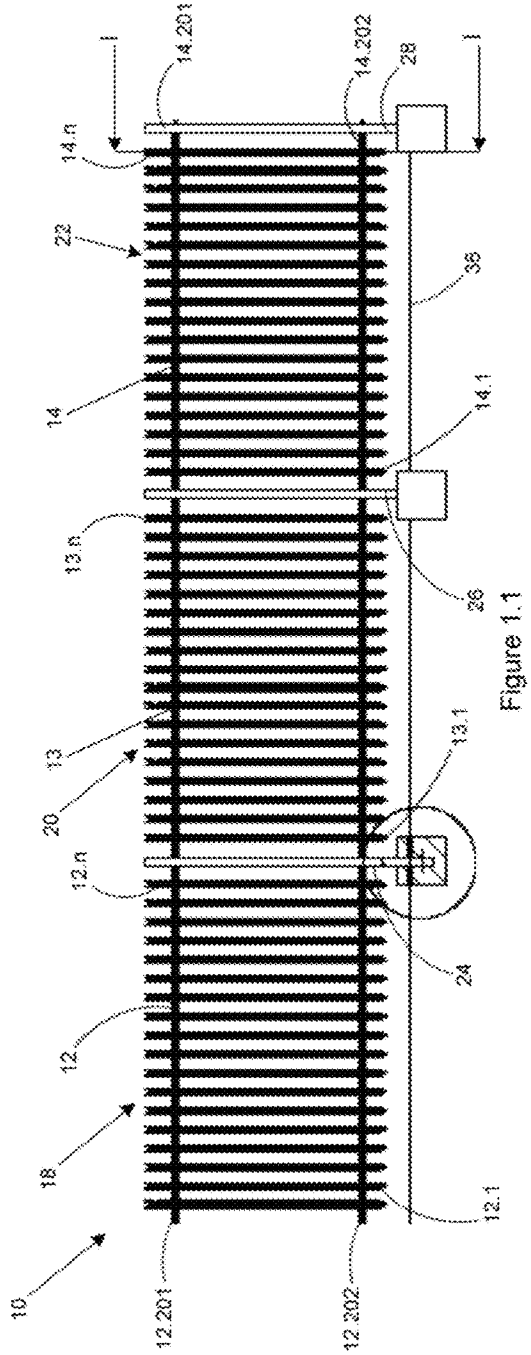
Figure 1.1
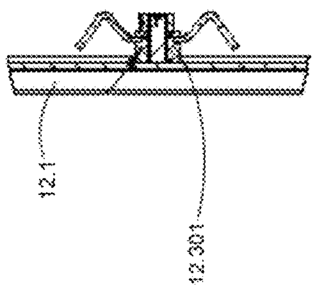
Figure 1.3

FENCE MONITORING

TECHNICAL FIELD

This invention relates to fence monitoring. In particular, this invention relates to a fence alarm and to a fence alarm system.

BACKGROUND

The inventor is aware of fences that provide physical barriers to entry. The inventor is further aware of fence alarm systems that can be connected to fences, such as electrified fence systems. However, said fence systems often do not provide a physical barrier to entry and is only effective when used in combination with a physical barrier to entry.

The invention aims to address this shortcoming.

SUMMARY

According to one aspect of the invention, there is provided a fence alarm, which includes

- a plurality of laterally spaced electrically conductive fence elements, the fence elements electrically being connected in series with each other;
- a sensing arrangement electrically connected to the plurality of conductive fence elements, the sensing arrangement being calibrated to a nominal electrical value, the sensing arrangement further being operable to sense a predefined deviation from the nominal electrical value caused by a deviation in an electrical property of the conductive fence elements.

In particular, the nominal electrical value may be a resistive value, the sensing arrangement further being operable to sense a predefined deviation from the nominal resistive value.

The sensing arrangement may be operable to trigger an alarm condition.

The conductive fence elements being connected in series with each other may be interspersed with fixed resistive values.

The predefined deviation from the nominal resistive value may be any one of an increased resistance, indicating an open circuit between the fence elements and a decreased resistance, indicating a short between fence elements.

The fence alarm may include indication means operable to indicate the trigger status of the sensing arrangement. In particular, the indication means may include audio indication means and visual indication means.

In one embodiment, the plurality of laterally spaced electrically conductive elements may be in the form of elongate profiled metallic bars, such as angled bars, round bars, square bars, rolled metal profiles, or the like.

In another embodiment, the fence elements may be defined by conductors mounted onto non-conductive fence elements.

The fence alarm may include a plurality of cross members extending transversely to the laterally spaced fence elements.

The fence alarm may include isolation means between the laterally spaced fence elements and the cross members, so that the cross members are electrically isolated from the fence elements.

The fence alarm may include support posts, supporting the combination of fence elements and cross members in an upright orientation to create a physical barrier to entry. The support posts may be connected to the cross members.

The fence alarm may include at least one trip wire, electrically connected in series with the plurality of laterally spaced fence elements.

The fence alarm, may include a power supply monitor operable to sense anomalies in the power supply to the fence alarm.

The invention extends to a fence alarm system, which includes a plurality of fence alarms as described above, which are connected to a central controller.

The central controller may include a wireless communication interface.

The wireless communication interface may be in the form of a mobile telephone network interface, such as a Global System for Mobile communications (GSM) interface.

The wireless communication interface may be operable to transmit the trigger status of a sensing arrangement of a fence alarm to a remote receiver.

The wireless communication interface may be operable to receive commands from a remote transmitter and the wireless communication interface may include output terminals that are switchable in response to said commands.

The central controller may include a fence identification facility, operable upon a sensing arrangement in a fence alarm triggering an alarm condition to identify the fence alarm which triggered the alarm and may be operable to communicate the trigger event via the wireless communication interface.

The invention will now be described by way of a non-limiting example only, with reference to the following drawings.

DRAWINGS

In the drawings:

FIG. 1.1 shows a drawing of a fence alarm system according to one aspect of the invention FIG. 1.2 shows a section of the fence alarm system taken at I-I;

FIG. 1.3 shows a detail of a mounting marked B in FIG. 1.2;

DETAILED DESCRIPTION

Figure 2:
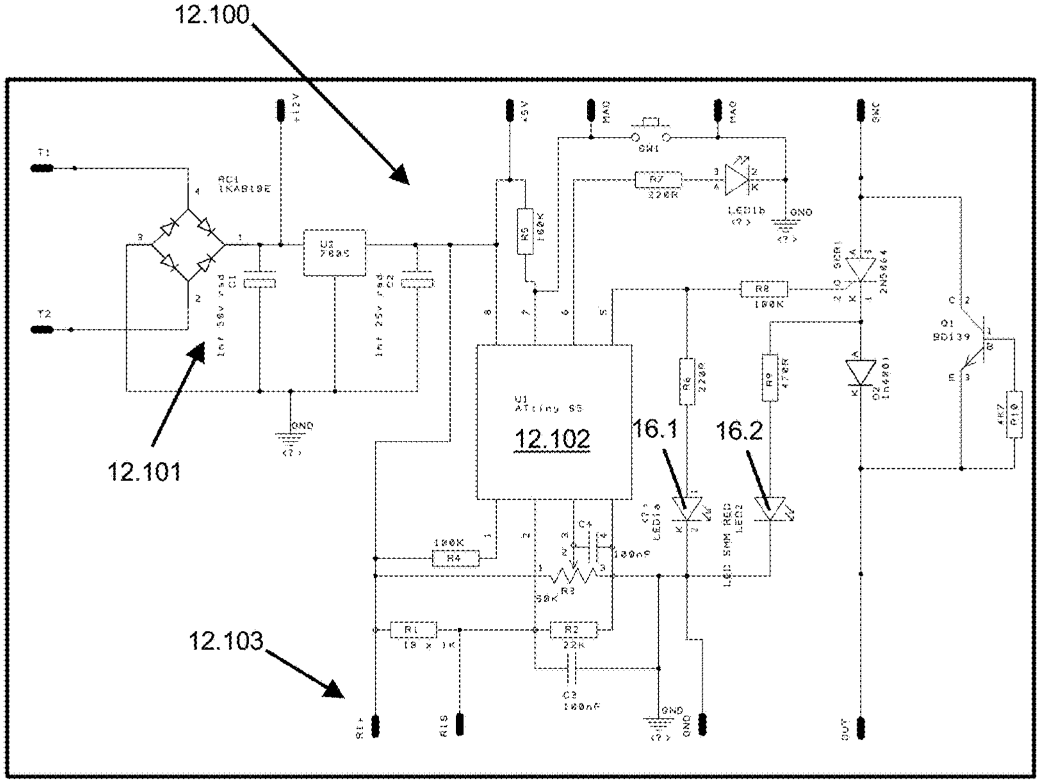
FIG. 2 shows a schematic block diagram of a sensing arrangement of one of the fence alarms of FIG. 1.1.

A side view of a fence alarm system 10 is shown in FIG. 1.1.

The fence alarm system 10 includes a plurality of fence alarms 12 to 14 connected to a central controller (not shown in FIG. 1).

Each of the fence alarms 12 to 14 includes a plurality of laterally spaced electrically conductive fence elements in the form of metal uprights **12.1-12.*n* to 14.1-14.*n* all of which are interspersed with fixed resistors (not shown). The fence elements 12.1-12.*n* to 14.1-14.*n*** are electrically connected in series with each other.

Each of the fence alarms 12 to 14 includes two cross members, in the form of angle irons 12.201, 12.202 to 14.201, 14.202 extending transversely to the laterally spaced fence elements 12.1-12.*n* to 14.1-14.*n*. The cross members 12.201, 12.202 to 14.201, 14.202 are electrically isolated from the fence elements 12.1-12.*n* to 14.1-14.*n*. by means of non conductive isolators 12.301-12.3*n* to 14.301-14.3*n* (see FIG. 1.3). The fence elements and cross members defines three fence alarm panels 18, 20, 22.

The fence alarm panels are supported by support posts 24, 26, 28 in an upright orientation to create a physical barrier to entry.

Each of the fence alarms 12 to 14 further includes a sensing arrangement 12.100 to 14.100 (see FIG. 2) electrically connected to the plurality of conductive fence elements 12.1-12.*n* to 14.1-14.*n*. The sensing arrangements 12.100 to 14.100 are each calibrated to a nominal resistive value for its particular series of conductive fence elements 12.1-12.*n* to 14.1-14.*n*. The sensing arrangements 12.100 to 14.100 are then operable to sense a predefined deviation from the nominal resistive value of its particular series of conductive fence elements 12.100 to 14.100.

The fence alarm system includes a trip wire 36 connected in series with the fence elements 12.1-12.*n* to 14.1-14.*n* and the sensing arrangement 12.100 to 14.100, operable, when damaged to cause the sensing arrangement to trigger an alarm condition.

In use, in the event that a particular sensing arrangement 12.100 to 14.100 detects a deviation from the nominal resistive value, the sensing arrangement 12.100 to 14.100 will trigger an alarm condition.

The sensing arrangements 12.100 to 14.100 are each arranged to detect if the deviation from the nominal resistive value is an increased resistance, indicating an open circuit between the fence elements 12.1-12.*n* to 14.1-14.*n* or a decreased resistance, indicating a short between some of the fence elements 12.1-12.*n* to 14.1-14.*n*.

The fence alarms 12 to 14 include sensing arrangement 12.100 to 14.100, of which one example, 12.100, is shown in FIG. 2. The sensing arrangement 12.100 of FIG. 2 includes a power supply 12.101, a microprocessor 12.102, which is connected to two LED's 16.1, 16.2, which are operable to indicate the trigger status of the sensing arrangement and a set of terminals 12.103 for connection to a central controller.

Figure 3:
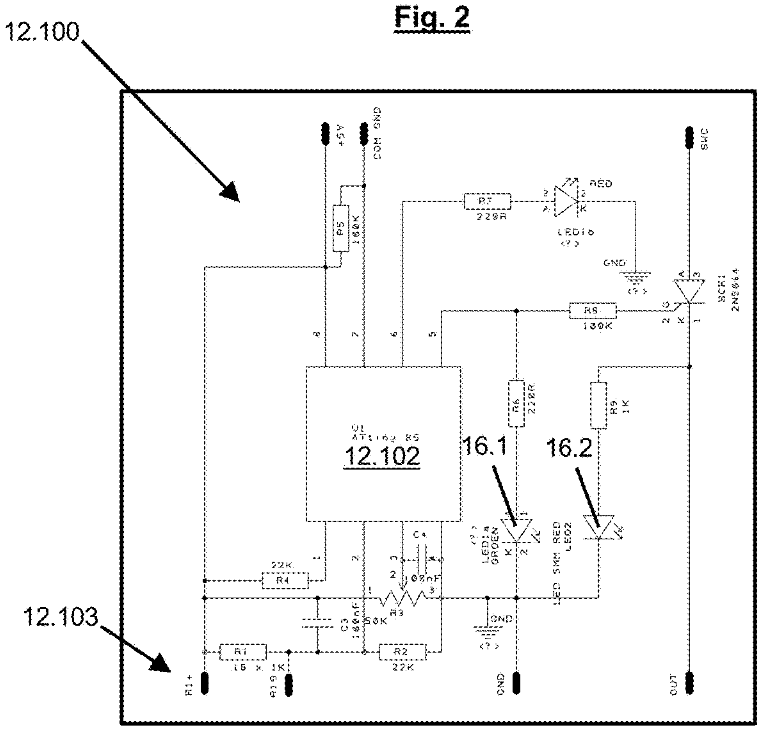
FIG. 3 shows a schematic block diagram of a modular add-on sensing arrangement similar to the sensing arrangement in FIG. 2.

FIG. 3 shows an add-on sensing arrangement 12.110, similar to 12.100 having a microprocessor 12.102, two LED's 16.1, 16.2, and a set of terminals 12.103, but without the power supply 12.101.

Figure 4:
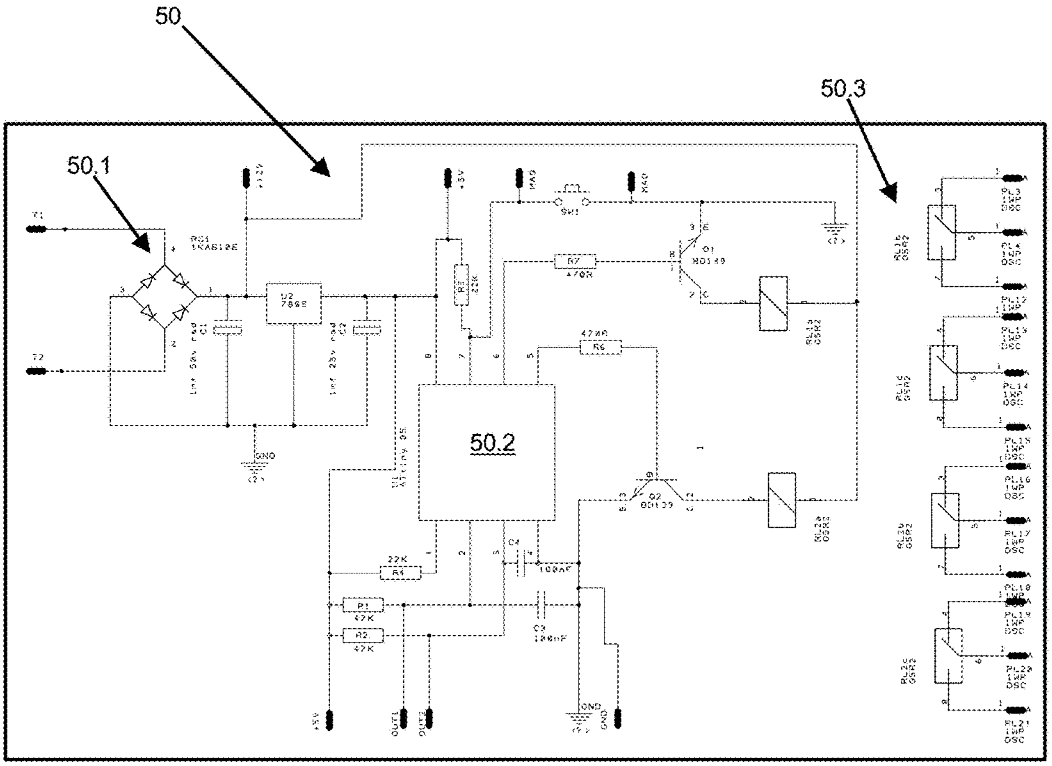
FIG. 4 shows a schematic block diagram of a central controller, which is connectable to a plurality of sensing arrangements, shown in FIG. 3.
Figure 5:
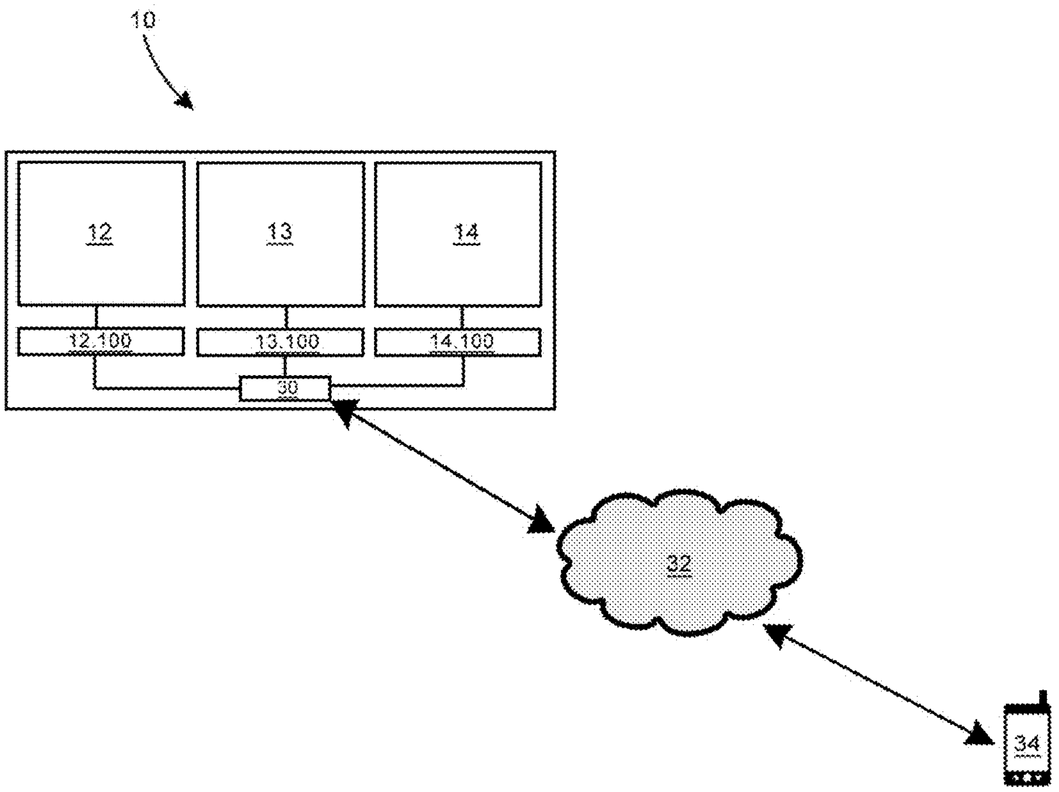
FIG. 5 shows a schematic block diagram of a fence alarm system in operation.

FIG. 4 shows a schematic block diagram of a central controller 50, which is connectable to a plurality of sensing arrangements, shown in FIG. 3. The central controller 50 includes a power supply 50.1, a microprocessor 50.2 and isolated relay contacts 50.3 for integration onto external alarm systems and fence systems (not shown). The central controller is also connectable to a wireless communication interface in the form of a mobile telephone network interface (not shown in FIG. 4).

The wireless communication interface is operable to transmit the trigger status of a sensing arrangement of a fence alarm to a remote receiver 34 via a mobile telephone network 32.

The inventor is of the opinion that the invention described in the specification includes a new a fence alarm, to a fence alarm system and to an alarm installation.

The invention claimed is:

1. A fence alarm, which includes a plurality of laterally spaced electrically conductive fence elements, the fence elements electrically being connected in series with each other;

a sensing arrangement electrically connected to the plurality of conductive fence elements, the sensing arrangement being calibrated to a nominal electrical value, the sensing arrangement further being operable to sense a predefined deviation from the nominal electrical value caused by a deviation in an electrical property of the conductive fence elements.

2. A fence alarm, as claimed in claim 1, in which the nominal electrical value is a resistive value, the sensing arrangement further being operable to sense the predefined deviation from the nominal resistive value.

3. A fence alarm, as claimed in claim 2, in which the sensing arrangement is operable to trigger an alarm condition.

4. A fence alarm, as claimed in claim 3, which includes indication means operable to indicate a trigger status of the sensing arrangement.

5. A fence alarm, as claimed in claim 4, in which the indication means includes audio indication means and visual indication means.

6. A fence alarm system, which includes a plurality of fence alarms as claimed in claim 4 which are connected to a central controller.

7. A fence alarm system, as claimed in claim 6, in which the central controller includes a wireless communication interface.

8. A fence alarm system, as claimed in claim 7, in which the wireless communication interface is in the form of a mobile telephone network interface.

9. A fence alarm system, as claimed in claim 8, in which the wireless communication interface is operable to transmit the trigger status of a sensing arrangement of a fence alarm to a remote receiver via a wireless communication interface in the form of a mobile telephone network.

10. A fence alarm system, as claimed in claim 9, in which the wireless communication interface is operable to receive commands from a remote transmitter and in which the wireless communication interface includes output terminals that are switchable in response to said commands.

11. A fence alarm system, as claimed in claim 10, in which the central controller includes a fence identification facility, operable upon a sensing arrangement in a fence alarm triggering an alarm condition to identify the fence alarm which triggered the alarm and communicating the trigger event via the wireless communication interface.

12. A fence alarm, as claimed in claim 2, in which the conductive fence elements being connected in series with each other are interspersed with fixed resistive values.

13. A fence alarm, as claimed in claim 2, in which the predefined deviation from the nominal resistive value is any one of an increased resistance, indicating an open circuit between the fence elements and a decreased resistance, indicating a short between fence elements.

14. A fence alarm, as claimed in claim 2, in which the plurality of laterally spaced electrically conductive elements are elongate profiled metallic bars.

15. A fence alarm, as claimed in claim 2, which includes a plurality of cross members extending transversely to the laterally spaced fence elements, the cross members being supported by support posts so that the cross members and the laterally space fence elements create a physical barrier to entry; and isolation means between the laterally spaced fence elements and the cross members, so that the cross members are electrically isolated from the fence elements.

16. A fence alarm, as claimed in claim 15, which includes at least one trip wire, electrically connected in series with the plurality of laterally spaced fence elements.

17. A fence alarm, as claimed in claim 2, in which the fence elements are defined by conductors mounted onto non-conductive fence elements.

* * * * *